US009113334B2

(12) United States Patent
Agarwal et al.

(10) Patent No.: US 9,113,334 B2
(45) Date of Patent: Aug. 18, 2015

(54) METHODS, SYSTEMS, AND COMPUTER READABLE MEDIA FOR CONTROLLING ACCESS TO VOICE RESOURCES IN MOBILE NETWORKS USING MOBILITY MANAGEMENT SIGNALING MESSAGES

(75) Inventors: Devesh Agarwal, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 530 days.

(21) Appl. No.: 12/051,374

(22) Filed: Mar. 19, 2008

(65) Prior Publication Data

US 2009/0196269 A1 Aug. 6, 2009

Related U.S. Application Data

(60) Provisional application No. 61/025,563, filed on Feb. 1, 2008.

(51) Int. Cl.
| | |
|---|---|
| *H04W 4/00* | (2009.01) |
| *G10L 21/00* | (2013.01) |
| *G10L 25/90* | (2013.01) |
| *H04W 12/08* | (2009.01) |
| *H04W 72/10* | (2009.01) |
| *H04L 29/06* | (2006.01) |
| *H04W 4/22* | (2009.01) |

(Continued)

(52) U.S. Cl.
CPC .............. *H04W 12/08* (2013.01); *H04W 72/10* (2013.01); *H04L 63/104* (2013.01); *H04W 4/22* (2013.01); *H04W 76/007* (2013.01); *H04W 76/04* (2013.01)

(58) Field of Classification Search
CPC ....... H04W 12/08; H04W 72/10; H04W 4/22; H04L 63/104

USPC .......................................... 370/341; 704/207
See application file for complete search history.

(56) References Cited

U.S. PATENT DOCUMENTS

| | | | |
|---|---|---|---|
| 5,809,239 A | 9/1998 | Dan et al. | |
| 5,822,534 A | 10/1998 | Yamunachari et al. | |
| 5,835,720 A | 11/1998 | Nelson et al. | |

(Continued)

FOREIGN PATENT DOCUMENTS

| | | | |
|---|---|---|---|
| AU | 2004247256 B2 | 11/2010 | |
| AU | 2005208846 B2 | 2/2011 | |

(Continued)

OTHER PUBLICATIONS

Notification of Transmittal of the International Search Report and the Written Opinion of the International Searching Authority, or the Declaration of International Application No. PCT/US2009/032746 (Aug. 26, 2009).

(Continued)

*Primary Examiner* — Shripal Khajuria
*Assistant Examiner* — Farhad Ali
(74) *Attorney, Agent, or Firm* — Jenkins, Wilson, Taylor & Hunt, P.A.

(57) ABSTRACT

Methods, systems, and computer readable media for controlling access to voice resources using mobility management messages are disclosed. According to one method, a mobility management message associated with a mobile subscriber is received. A priority level of the mobile subscriber is determined based on the mobility management message and access to voice resources in controlled based on the priority level.

13 Claims, 10 Drawing Sheets

(51) Int. Cl.
*H04W 76/00* (2009.01)
*H04W 76/04* (2009.01)

(56) References Cited

U.S. PATENT DOCUMENTS

| | | | |
|---|---|---|---|
| 5,878,115 A * | 3/1999 | Valentine et al. | 455/421 |
| 5,926,463 A | 7/1999 | Ahearn et al. | |
| 6,023,725 A | 2/2000 | Ozawa et al. | |
| 6,046,981 A | 4/2000 | Ramamurthy et al. | |
| 6,067,457 A | 5/2000 | Erickson et al. | |
| 6,076,108 A | 6/2000 | Courts et al. | |
| 6,128,644 A | 10/2000 | Nozaki | |
| 6,130,898 A | 10/2000 | Kostreski et al. | |
| 6,167,445 A | 12/2000 | Gai et al. | |
| 6,201,790 B1 | 3/2001 | Teboul | |
| 6,324,184 B1 | 11/2001 | Hou et al. | |
| 6,366,577 B1 | 4/2002 | Donovan | |
| 6,385,454 B1 | 5/2002 | Bahl et al. | |
| 6,463,454 B1 | 10/2002 | Lumelsky et al. | |
| 6,466,980 B1 | 10/2002 | Lumelsky et al. | |
| 6,490,727 B1 | 12/2002 | Nazarathy et al. | |
| 6,571,288 B1 | 5/2003 | Sarukkai | |
| 6,578,076 B1 | 6/2003 | Putzolu | |
| 6,594,826 B1 | 7/2003 | Rao et al. | |
| 6,597,920 B2 | 7/2003 | Yegani et al. | |
| 6,680,922 B1 | 1/2004 | Jorgensen | |
| 6,708,209 B1 | 3/2004 | Ebata et al. | |
| 6,728,887 B1 | 4/2004 | Dziekan et al. | |
| 6,731,932 B1 * | 5/2004 | Rune et al. | 455/432.1 |
| 6,738,390 B1 | 5/2004 | Xu et al. | |
| 6,745,043 B1 | 6/2004 | Lester et al. | |
| 6,771,595 B1 | 8/2004 | Gilbert et al. | |
| 6,771,639 B1 | 8/2004 | Holden | |
| 6,798,757 B2 | 9/2004 | Mizutani | |
| 6,804,717 B1 | 10/2004 | Bakshi et al. | |
| 6,898,641 B1 | 5/2005 | Kobayashi | |
| 6,930,984 B1 | 8/2005 | Nomura et al. | |
| 6,947,378 B2 | 9/2005 | Wu et al. | |
| 6,973,488 B1 | 12/2005 | Yavatkar et al. | |
| 6,975,594 B1 | 12/2005 | Byers | |
| 6,988,148 B1 | 1/2006 | Sheth | |
| 7,024,199 B1 | 4/2006 | Massie et al. | |
| 7,027,391 B2 | 4/2006 | Sahinoglu et al. | |
| 7,113,502 B2 | 9/2006 | Oz et al. | |
| 7,126,920 B2 | 10/2006 | Venkatesulu et al. | |
| 7,139,813 B1 | 11/2006 | Wallenius | |
| 7,143,433 B1 | 11/2006 | Duan et al. | |
| 7,168,086 B1 | 1/2007 | Carpenter et al. | |
| 7,174,375 B2 | 2/2007 | King et al. | |
| 7,236,791 B2 | 6/2007 | Chambers et al. | |
| 7,274,662 B1 | 9/2007 | Kalmanek, Jr. et al. | |
| 7,319,691 B2 | 1/2008 | Qing et al. | |
| 7,330,710 B1 * | 2/2008 | Xu et al. | 455/404.1 |
| 7,430,187 B2 | 9/2008 | Holt et al. | |
| 7,451,475 B1 | 11/2008 | Oz et al. | |
| 7,535,888 B1 | 5/2009 | Carlucci et al. | |
| 7,738,440 B2 | 6/2010 | Riley et al. | |
| 7,805,515 B2 | 9/2010 | Riley | |
| 7,904,541 B2 | 3/2011 | Swildens et al. | |
| 8,595,787 B2 | 11/2013 | Riley et al. | |
| 8,619,630 B2 | 12/2013 | Riley et al. | |
| 8,750,279 B2 | 6/2014 | Riley et al. | |
| 2001/0042097 A1 | 11/2001 | Lapine | |
| 2001/0055305 A1 | 12/2001 | Oz et al. | |
| 2002/0010938 A1 | 1/2002 | Zhang et al. | |
| 2002/0029274 A1 | 3/2002 | Allen | |
| 2002/0032794 A1 | 3/2002 | Nishida et al. | |
| 2002/0036983 A1 | 3/2002 | Widegren et al. | |
| 2002/0042924 A1 | 4/2002 | Adams | |
| 2002/0059274 A1 | 5/2002 | Hartsell | |
| 2002/0059638 A1 | 5/2002 | Oz et al. | |
| 2002/0087995 A1 | 7/2002 | Pedlow, Jr. | |
| 2002/0122422 A1 | 9/2002 | Kenney et al. | |
| 2002/0126633 A1 | 9/2002 | Mizutani et al. | |
| 2002/0126699 A1 | 9/2002 | Cloonan | |
| 2002/0150044 A1 | 10/2002 | Wu et al. | |
| 2002/0151312 A1 | 10/2002 | Rosemarijn Bos et al. | |
| 2002/0169794 A1 | 11/2002 | Jones | |
| 2003/0055971 A1 | 3/2003 | Menon | |
| 2003/0069954 A1 | 4/2003 | Ma | |
| 2003/0069972 A1 | 4/2003 | Yoshimura et al. | |
| 2003/0086425 A1 | 5/2003 | Bearden et al. | |
| 2003/0204856 A1 | 10/2003 | Buxton | |
| 2003/0208609 A1 | 11/2003 | Brusca | |
| 2003/0217368 A1 | 11/2003 | Ramaswamy | |
| 2003/0229692 A1 | 12/2003 | Vo | |
| 2004/0015986 A1 | 1/2004 | Carver et al. | |
| 2004/0039803 A1 | 2/2004 | Law | |
| 2004/0044762 A1 | 3/2004 | Peacock | |
| 2004/0083267 A1 | 4/2004 | Thompson | |
| 2004/0088730 A1 | 5/2004 | Gopalan et al. | |
| 2004/0125779 A1 | 7/2004 | Kelton et al. | |
| 2004/0213166 A1 | 10/2004 | Rambaldi | |
| 2004/0225687 A1 | 11/2004 | Larsson et al. | |
| 2005/0039213 A1 | 2/2005 | Matarese et al. | |
| 2005/0053085 A1 | 3/2005 | Doh et al. | |
| 2005/0073997 A1 | 4/2005 | Riley et al. | |
| 2005/0076336 A1 | 4/2005 | Cutrell et al. | |
| 2005/0091505 A1 | 4/2005 | Riley et al. | |
| 2005/0120128 A1 | 6/2005 | Willes et al. | |
| 2005/0125832 A1 | 6/2005 | Jost et al. | |
| 2005/0149940 A1 | 7/2005 | Calinescu et al. | |
| 2005/0163060 A1 | 7/2005 | Riley et al. | |
| 2005/0188415 A1 | 8/2005 | Riley | |
| 2005/0228892 A1 | 10/2005 | Riley et al. | |
| 2005/0289619 A1 | 12/2005 | Melby | |
| 2006/0038877 A1 | 2/2006 | Richardson et al. | |
| 2006/0068762 A1 * | 3/2006 | Baldwin et al. | 455/412.1 |
| 2007/0043558 A1 * | 2/2007 | Schwarz et al. | 704/207 |
| 2007/0047478 A1 | 3/2007 | Balachandran et al. | |
| 2007/0149203 A1 | 6/2007 | Sliva | |
| 2008/0125152 A1 * | 5/2008 | Hou | 455/466 |
| 2008/0151881 A1 | 6/2008 | Liu et al. | |
| 2010/0306369 A1 | 12/2010 | Riley | |
| 2010/0316064 A1 | 12/2010 | Riley et al. | |

FOREIGN PATENT DOCUMENTS

| | | |
|---|---|---|
| AU | 2005208847 B2 | 3/2011 |
| CA | 2 276 526 A1 | 7/1998 |
| CA | 2 528 871 | 1/2014 |
| CA | 2 528 648 | 4/2014 |
| EP | 1 631 917 B1 | 12/2010 |
| JP | 4582346 | 9/2010 |
| KR | 10-2001-0027383 | 4/2001 |
| WO | WO 00/11879 | 3/2000 |
| WO | WO 00/79794 A2 | 12/2000 |
| WO | WO 03/009629 | 1/2003 |
| WO | WO 03/014958 A1 | 2/2003 |
| WO | WO 03/042856 A2 | 5/2003 |
| WO | WO 03/052993 A2 | 6/2003 |
| WO | WO 2005/033899 A2 | 4/2005 |
| WO | WO 2005/072320 A2 | 8/2005 |
| WO | WO 2005/072321 A2 | 8/2005 |

OTHER PUBLICATIONS

Non-Final Official Action for U.S. Appl. No. 12/646,542 (Mar. 24, 2011).
Official Action for U.S. Appl. No. 10/867,159 (Mar. 21, 2011).
Certificate of Patent for Japanese Patent Application No. 2006-551387 (Dec. 24, 2010).
Official Action for Japanese Application No. 2006-551384 (Dec. 20, 2010).
Notice of Acceptance for Australian Patent Application No. 2005208847 (Nov. 22, 2010).
Allowance Notice for Japanese Patent Application No. 2006-551387 (Nov. 16, 2010).
Notice of Acceptance for Australian Patent Application No. 2005208846 (Oct. 27, 2010).
Examiner's Report for Australian Patent Application No. 2005208847 (Oct. 14, 2010).

(56) References Cited

OTHER PUBLICATIONS

Communication of European publication number and information on the application of Article 67(3) EPC for European application No. 09709156.5 (Oct. 13, 2010).
Supplementary European Search Report for European Application No. 05706071.7 (Sep. 8, 2010).
Notice of Allowance for JP 2006-533793 (Jul. 20, 2010).
Official Action for U.S. Appl. No. 10/867,159 (Jul. 19, 2010).
Examiner's Answer for U.S. Appl. No. 10/867,157 (Jul. 8, 2010).
Official Action for Japanese Patent Application No. 2006-551387 (Jul. 6, 2010).
Communication under Rule 71(3)EPC for European Application No. 04755299.7 (Jun. 21, 2010).
Supplemental Notice of Allowability for U.S. Appl. No. 11/041,918 (Jun. 10, 2010).
Communication pursuant to Article 94(3) EPC for European application No. 04755130.4 (Apr. 27, 2010).
Notice of Allowance and Fee(s) Due for U.S. Appl. No. 11/041,918 (Apr. 21, 2010).
Official Action for Japanese Patent Application No. 2006-551387 (Mar. 15, 2010).
Notice of Allowance and Fee(s) Due for U.S. Appl. No. 10/867,158 (Jan. 15, 2010).
Notice of Panel Decision from Pre-Appeal Brief Review for U.S. Appl. No. 10/867,157 (Dec. 18, 2009).
Advisory Action for U.S. Appl. No. 10/867,157 (Sep. 23, 2009).
Japanese Official Action issued for 2006-533793, 1 page (Sep. 15, 2009).
Non-Final Official Action for U.S. Appl. No. 11/041,918 (Aug. 25, 2009).
Notice of Allowance and Fee(s) Due for U.S. Appl. No. 10/867,158 (Aug. 5, 2009).
Final Official Action for U.S. Appl. No. 11/041,779 (Jun. 24, 2009).
European Search Report issued for European Application No. 05797862 (Jun. 3, 2009).
Final Official Action for U.S. Appl. No. 10/867,157 (Apr. 17, 2009).
Examiner's Report for Australian Patent Application No. 2005208847 (Feb. 27, 2009).
Examiner's First Report for Australian Patent Application No. 2005208846 (Jan. 15, 2009).
Final Official Action for U.S. Appl. No. 11/041,918 (Dec. 22, 2008).
Australian Examiner's Report issued for Application No. 2004247256 (Nov. 18, 2008).
Advisory Action for U.S. Appl. No. 10/867,159 (Oct. 22, 2008).
Official Action for U.S. Appl. No. 10/867,158 (Oct. 17, 2008).
Supplementary European Search Report for European Application No. EP05706073.3 (Oct. 6, 2008).
Official Action for U.S. Appl. No. 10/867,157 (Sep. 26, 2008).
Non-Final Official Action for U.S. Appl. No. 11/041,779 (Aug. 21, 2008).
Final Official Action for U.S. Appl. No. 10/867,159 (May 16, 2008).
Non-Final Official Action for U.S. Appl. No. 11/041,918 (May 6, 2008).
Final Official Action for U.S. Appl. No. 10/867,157 (Mar. 24, 2008).
Official Action for U.S. Appl. No. 10/867,159 (Oct. 4, 2007).
Official Action for U.S. Appl. No. 10/867,157 (Sep. 20, 2007).
European Patent Office, Supplementary European Search Report for European Patent Application No. 04755130.4 (Sep. 4, 2007).
Notification of Transmittal of the International Search Report and the Written Opinion of the International Searching Authority, or the Declaration for International Application No. PCT/US05/02260 (Apr. 26, 2007).
European Search Report for European Application No. 04755299.7 (Mar. 23, 2007).
Notification of European publication number and information on the application of Article 67(3) EPC for European Application No. 05706073.3 (Nov. 15, 2006).
Notification of Transmittal of the International Search Report and the Written Opinion of the International Search Authority, or the Declaration for International Application No. PCT/US05/02264 (Sep. 7, 2006).
Notification of European publication number and information on the application of Article 67(3) EPC for European Application No. 05706071.7 (Sep. 6, 2006).
"Data Over Cable System Interface Specification Quality of Service Management Information Base (DOCSIS-QOS MIB)," (Feb. 2005).
International Search Report for International Application No. PCT/US04/19024 (Dec. 9, 2004).
"PacketCable Dynamic Quality-of-Service-Specification," PKT-SP-DQOS-I09-040402, I09 (Apr. 2, 2004).
"PacketCable Multimedia Architecture Framework Technical Report," PKT-TR-MM-ARCH-V01-030627, V01 (Jun. 27, 2003).
"PacketCable Multimedia Specification," PKT-SP-MM-I01-030627, I01 (Jun. 27, 2003).
"SIP: Session Initiation Protocol," RFC 3261 (Jun. 2002).
Kutscher et al., "Session Description and Capability Negotiation Draft-IETF-MUSIC-SDPNG-03. TXT" IETF Request for Comments, pp. 1-61, XP002205059 (Nov. 21, 2001).
Ed Miller et al., "The PacketCable Architecture," IEEE Communications Magazine, IEEE Service Center, Piscataway, US, vol. 39, No. 6, pp. 90-96, XP011091736 ISSN: 0163-6804 (Jun. 2001).
"PacketCable 1.2 Architecture Framework Technical Report," PKT-TR-ARCH1.2-V01-001229, V01 (Dec. 29, 2000).
"SDP: Session Description Protocol," RFC 2327 (Apr. 1998).
Schulzrinne et al., "Real Time Streaming Protocol (RTSP)," RFC 2326, pp. 1-92 (Apr. 1998).
Shenker et al., "Specification of Guaranteed Quality of Service," RFC 2212, pp. 1-20 (Sep. 1997).
Wroclawski, "Specification of the Controlled-Load Network Element Service," RFC 2211, pp. 1-19 (Sep. 1997).
Wroclawski, "The Use of RSVP with IETF Integrated Services," RFC 2210, pp. 1-33 (Sep. 1997).
Braden et al., "Resource ReSerVation Protocol (RSVP) —Version 1 Functional Specification," RFC 2205, pp. 1-112 (Sep. 1997).
"Cable Modem Termination System —Network Side Interface Specification," SP-CMTS-NSII01-960702, I01 (Jul. 2, 1996).
Rose et al, "Concise MIB Definitions," RFC 1212, pp. 1-19 (Mar. 1991).
Case et al, "A Simple Network Management Protocol (SNMP)," RFC 1157, pp. 1-36 (May 1990).
Rose et al, "Structure and Identification of Management Information for TCP/IP-based Internets," RFC 1155, pp. 1-22 (May 1990).
Final Official Action for U.S. Appl. No. 12/646,542 (Oct. 25, 2011).
Final Official Action for U.S. Appl. No. 10/867,159 (Jul. 16, 2012).
Non-Final Official Action for U.S. Appl. No. 12/757,544 (Jun. 4, 2012).
Second Office Action for Canadian Application No. 2,528,648 (May 22, 2012).
First Office Action for Canadian Application No. 2 528 871 (Jan. 24, 2012).
First Office Action for Canadian Patent Application No. 2,528,648 (Aug. 12, 2011).
Notice of Panel Decision from Pre-Appeal Brief Review for U.S. Appl. No. 10/867,159 (May 30, 2013).
Notice of Allowance for Canadian Application No. 2,528,871 (May 21, 2013).
Decision on Appeal for U.S. Appl. No. 10/867,157 (Apr. 11, 2013).
First Office Action for Canadian Application No. 2,554,177 (Mar. 11, 2013).
Third Office Action for Canadian Application No. 2,528,648 (Jan. 22, 2013).
Second Office Action for Canadian Application No. 2,528,871 (Jan. 21, 2013).
First Office Action for Chinese Application No. 200980111437.X (Jan. 4, 2013).
Final Office Action for U.S. Appl. No. 12/757,544 (Jan. 3, 2013).
Applicant-Initiated Interview Summary for U.S. Appl. No. 12/757,544 (Sep. 10, 2012).
First Office Action for Canadian Application No. 2,554,176 (Aug. 27, 2012).

(56) References Cited

OTHER PUBLICATIONS

Non-Final Office Action for U.S. Appl. No. 12/646,542 (Nov. 6, 2014).
Notice of Allowance for Canadian Application No. 2,554,177 (Oct. 30, 2014).
Third Office Action for Chinese Application No. 200980111437.X (Aug. 11, 2014).
Reexamination Decision for Chinese Application No. 200980111437.X (Jul. 24, 2014).
Applicant-Initiated Interview Summary for U.S. Appl. No. 12/646,542 (Jul. 22, 2014).
Advisory Action Before the Filing of an Appeal Brief for U.S. Appl. No. 12/646,542 (Jul. 10, 2014).
Extended European Search Report for European Application No. 10184422.3 (Apr. 30, 2014).
Final Office Action for U.S. Appl. No. 12/646,542 (Apr. 16, 2014).
Notice of Allowance and Fee(s) Due for U.S. Appl. No. 12/646,542 (Mar. 30, 2015).
Applicant-Initiated Interview Summary for U.S. Appl. No. 12/646,542 (Mar. 12, 2015).
Office Action for Canadian Application No. 2,840,432 (Feb. 17, 2015)
Office Action for Canadian Application No. 2,554,176 (Feb. 4, 2015).
Letter Regarding Decision to Grant for Chinese Application No. ZL200980111437.X (Feb. 3, 2015).
Final Office Action for Chinese Application No. 200980111437.X (Mar. 4, 2014).
Notice of Allowance and Fee(s) Due for U.S. Appl. No. 12/757,544 (Feb. 5, 2014).
Applicant-Initiated Interview Summary for U.S. Appl. No. 12/646,542 (Jan. 31, 2014)
Non-Final Office Action for U.S. Appl. No. 12/646,542 (Oct. 25, 2013).
Notice of Allowance and Fee(s) Due for U.S. Appl. No. 10/867,159 (Aug. 20, 2013).
Notice of Allowance and Fee(s) Due for U.S. Appl. No. 10/867,157 (Jul. 22, 2013).
Non-Final Office Action for U.S. Appl. No. 12/757,544 (Jul. 8, 2013).
Second Office Action for Canadian Application No. 2,554,177 (Jan. 10, 2014).
Extended European Search Report for European Application No. 09709156.5 (Dec. 5, 2013).
Notice of Allowance for Canadian Application No. 2,528,648 (Nov. 25, 2013).
Second Office Action for Canadian Application No. 2,554,176 (Nov. 12, 2013).
Second Office Action for Chinese Application No. 200980111437.X (Oct. 22, 2013).

* cited by examiner

METHODS, SYSTEMS, AND COMPUTER READABLE MEDIA FOR CONTROLLING ACCESS TO VOICE RESOURCES IN MOBILE NETWORKS USING MOBILITY MANAGEMENT SIGNALING MESSAGES

RELATED APPLICATIONS

This application claims the benefit of U.S. Provisional Patent Application Ser. No. 61/025,563 filed Feb. 1, 2008; the disclosure of which is incorporated herein by reference in its entirety.

TECHNICAL FIELD

The subject matter described herein generally relates to the allocation of voice resources in mobile networks. More specifically, the subject matter relates to methods, systems, and computer readable media for controlling access to voice resources in mobile networks using mobility management signaling messages.

BACKGROUND

A conventional mobile network may be composed of a voice network component and a signaling network component. The voice component may include one or more trunk lines divided into several bearer channels capable of transmitting voice data (i.e. calls) for a relatively small number of subscribers. For example, a single voice trunk may be only capable of carrying 32 channels simultaneously. As used herein, the term "voice resources" refers to the resources in the network that carry voice data.

In contrast, the signaling component of a mobile network may be capable of serving a relatively large number of subscribers. For example, a single signaling communications link may be capable of serving up to 50,000 subscribers, including call setup, call teardown, and other call maintenance modules. Additionally, the signaling network may be utilized for performing modules other than call setup and teardown, such as the delivery of simple message service (SMS) messages, multimedia message service (MMS) messages, or providing number portability (NP) functionality. The signaling network may also include one or more signaling nodes for managing the allocation of voice resources for mobile users. Therefore, voice resources are typically scarce in comparison to signaling resources in mobile communications networks.

During conventional operation, registration in a mobile network is open to any mobile user. For example, when a mobile user activates his or her mobile handset, the handset may automatically register with the mobile network in order to provide availability and location information to the mobile network. Upon registration, mobile users may place calls on a first-come, first-served basis. For example, a calling party may initiate a call to a called party by dialing a subscriber identifier associated with the called party into his or her handset. One or more signaling messages may then be exchanged between signaling nodes in order to setup the call which may include allocating voice resources. After voice resources are allocated, the call may be maintained until one of the parties initiates call teardown. For example, call teardown may be initiated when a party sends a signal from his or her handset (i.e. hangs up) and signaling messages may again be exchanged between signaling nodes so that voice resources may be released for use in another call.

An important assumption of conventional mobile network operation is that only a small percentage of registered users place calls simultaneously. Therefore, a larger number of users may be registered in the signaling component of the network than the voice component is capable of processing. For example, one million subscribers may be registered in a mobile network serving Raleigh, N.C. However, only one thousand calls may need to be connected and maintained simultaneously at any given time. Therefore, an implicit assumption of the mobile network is that no more than one percent of registered users will require access to voice resources at a given time.

One problem associated with conventional mobile networks is that high priority users may not have access to voice resources during an emergency or other high traffic event. For example, during an emergency (i.e., earthquake, tsunami, terrorist attack, etc.), a dramatic increase in the number of users placing mobile calls occurs. Some users may attempt to call loved ones, other users may be attempting to coordinate emergency services, while yet other users may be unaware of the emergency and be placing non-essential calls. During this time period, the number of call setup requests increases beyond the voice capacity of the voice network to handle it. As a result, users may be denied access to voice resources (i.e., placing mobile calls) on a first-come, first-served basis. Therefore, it is appreciated that during an emergency, the assumption that a small percentage of registered users desire to place calls simultaneously becomes invalid.

Because calls may be processed on a first-come, first-served basis, first responders or other high priority users may be prevented from placing mobile calls during an emergency resulting in an inefficient allocation of voice resources. A first come, first served system for allocating voice resources may harm emergency efforts by inhibiting communications between users such as policemen, firemen, and government officials. This problem may acutely impact areas in which there are no voice resources dedicated for emergency purposes. In such areas, first responders or other high priority users typically rely on mobile networks to provide high priority communications during an emergency, yet may be unable to do so due to overwhelmed conventional voice components of mobile networks.

Accordingly, in light of these difficulties, a need exists for improved methods and systems for controlling access to mobile voice resources during an emergency or other high traffic event.

SUMMARY

Methods, systems, and computer readable media for controlling access to voice resources using mobility management messages are disclosed. According to one method, a mobility management message associated with a mobile subscriber is received. A priority level of the mobile subscriber is determined based on the mobility management message and access to voice resources in controlled based on the priority level.

A system for controlling access to voice resources using mobility management messages is also disclosed. The system includes a subscriber access database for associating mobility management information and a priority level, wherein the mobility management information and the priority level are associated with a mobile subscriber. A subscriber access module is configured to receive a mobility management message including the mobility management information and determine the priority level of the mobile subscriber based on the mobility management information. The subscriber access module is also configured to control access to voice resources based on the priority level.

The subject matter described herein for controlling access to voice resources using mobility management messages may be implemented using a computer readable medium having stored thereon computer executable instructions that when executed by a computer processor of a computer perform steps. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a call described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
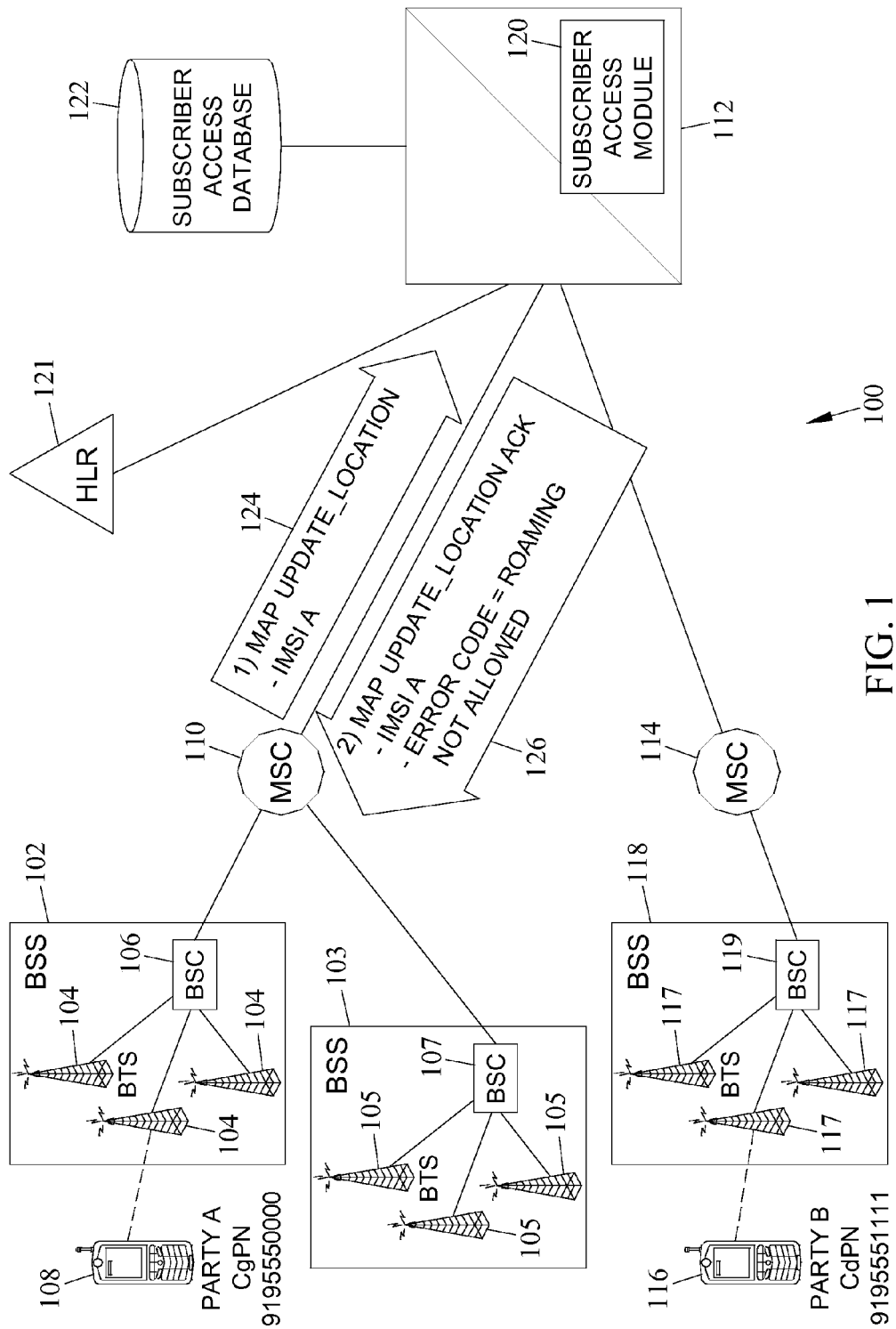
FIG. 1 is a network diagram of a mobile communications network including a subscriber access module for controlling access to voice resources using mobility management messages according to an embodiment of the subject matter described herein.

FIG. 1 is a network diagram of a mobile communications network including a subscriber access module for controlling access to voice resources using mobility management messages according to an embodiment of the subject matter described herein. Referring to FIG. 1, network 100 includes a GSM network. As such, network 100 includes one or more base station subsystems (BSS) 102, each BSS 102 containing one or more base transceiver stations (BTS) 104 connected to one or more base station controllers (BSC) 106. BSS 102 may be responsible for processing signaling and voice traffic from mobile devices. In this case, the mobile device may include mobile phone 108 associated with calling party A (hereinafter simply user 108 or calling party 108). MSC 110 may be connected to BSS 102 and provide circuit switched calling, mobility management and GSM services for mobile phones roaming within a service area. One or more communications signaling nodes, such as signal transfer points (STPs) or signaling gateways (SGs) may provide signaling message routing and processing modules. For example, STP/SG 112 may be connected to different types of signaling nodes for routing messages between MSC 110, MSC 114, and HLR 121.

In FIG. 1, subscriber access module 120 is integrated with STP/SG 112 for controlling access to voice resources based on a received mobility management message and subscriber access database 122 is independently located and accessible by STP/SG 112 for storing associated mobility management information and priority levels for mobile subscribers. However, it is appreciated that subscriber access module 120 and subscriber access database 122 may be integrated or co-located with STP/SG 112, or may be separately located and accessible by STP/SG 112 without departing from the scope of the subject matter described herein.

Subscriber access module 120 may receive a mobility management message including a subscriber identifier, determine a priority level of the user based on the mobility management message, and limit access to voice resources based on the priority level. For example, subscriber access module may intercept MAP update location message 124 which is directed to HLR 121 and extract one or more parameters. In this case, MAP update location message 124 includes IMSI associated with user A 108, therefore subscriber access module 120 may extract and use IMSI A to query subscriber access database 122. As described above, subscriber access database 122 may associate mobility management information with one or more priority levels for a mobile subscriber. Therefore, the result of the query performed by subscriber access module based on IMSI A may include a priority level associated with user A 108. Subscriber access module 120 may use the determined priority level to control access to voice resources for user 108. For example, as shown in FIG. 1, subscriber access module 120 may generate and return MAP update location acknowledgment message 126 including an error code. Exemplary error codes that may be included in MAP update location message include roaming not allowed, unknown subscriber, system failure, or unexpected data value. Upon receiving MAP update location acknowledgment message 126 including the error code, MSC 110 may be unable to register user 108 in network 100. Accordingly, voice resources may be preserved for high priority callers during an emergency.

Subscriber access database 122 may include one or more subscriber identifiers and priority level associated with a mobile subscriber. For example, in one embodiment, subscriber access database 122 may include calling party number (CgPN) 9195550000 associated with priority level 5, where priority level may range from 1-7, 1 being the lowest priority level and 7 being the highest priority level. It is appreciated that a variety of subscriber identifiers and mobility management information may be associated with a priority level for controlling access to voice resources. Mobility management information may include, but is not limited to, a directory number (DN), an international mobile equipment identifier (IMEI), an international mobile subscriber identifier (IMSI), a mobile subscriber integrated services digital network number (MSISDN), and a uniform resource indicator (URI).

As described above, one problem associated with conventional mobile networks is that during an emergency, or other high traffic event, first responders or other high priority users may not have access to voice resources. For example, during an emergency, such as an earthquake (tsunami, terrorist attack etc.), a dramatic increase in the number of users placing mobile calls occurs. Some users may be attempting to locate loved ones, other users may be attempting to coordinate emergency services, while other users may be unaware of the emergency and placing non-essential calls. The assumption that a small percentage of registered users desire to place calls simultaneously becomes invalid during the emergency. The number of call setup requests increases beyond the capacity of the voice network to handle it. As a result, users may be prevented from placing mobile calls on a first-come, first-served basis.

Calling party 108 may be a first responder or other government official, such as a firefighter, policeman, aid worker, or mayor. Each of these examples may be allowed to place calls during an emergency. Other users not associated with providing emergency services may be given a lower priority level and therefore may be preventing from registering in the network and tying up valuable voice resources.

It is appreciated that the subject matter described herein may be applied more broadly than just during emergencies. For example, a priority level may be assigned to users based on usage, price, etc. in addition to an emergency priority. Therefore, voice resources may be optimally used at all times to satisfy the highest priority level customers. In one such embodiment, basic plan customers may be assigned priority level 3 and premium plan subscribers may be assigned priority level 6. During off-peak hours, the priority level threshold may be set at 2 by a mobile system administrator. Accordingly, because both priority level 3 and priority level 6 customers meet the threshold, both users may register and use network 100 on a first come, first served basis. However, during peak hours, the priority level may be increased to level 5, thereby preventing basic plan subscribers from registering in network 100, while maintaining access to voice resources for premium plan subscribers.

In addition to network 100 illustrated in FIG. 1, other types of networks may be used without departing from the scope of the subject matter described herein. For example, network 100 may include a universal mobile telecommunications system (UMTS) network or a session initiation protocol (SIP) network, each of which will be described in greater detail below with respect to embodiments illustrated in FIGS. 6 and 8.

Figure 2:
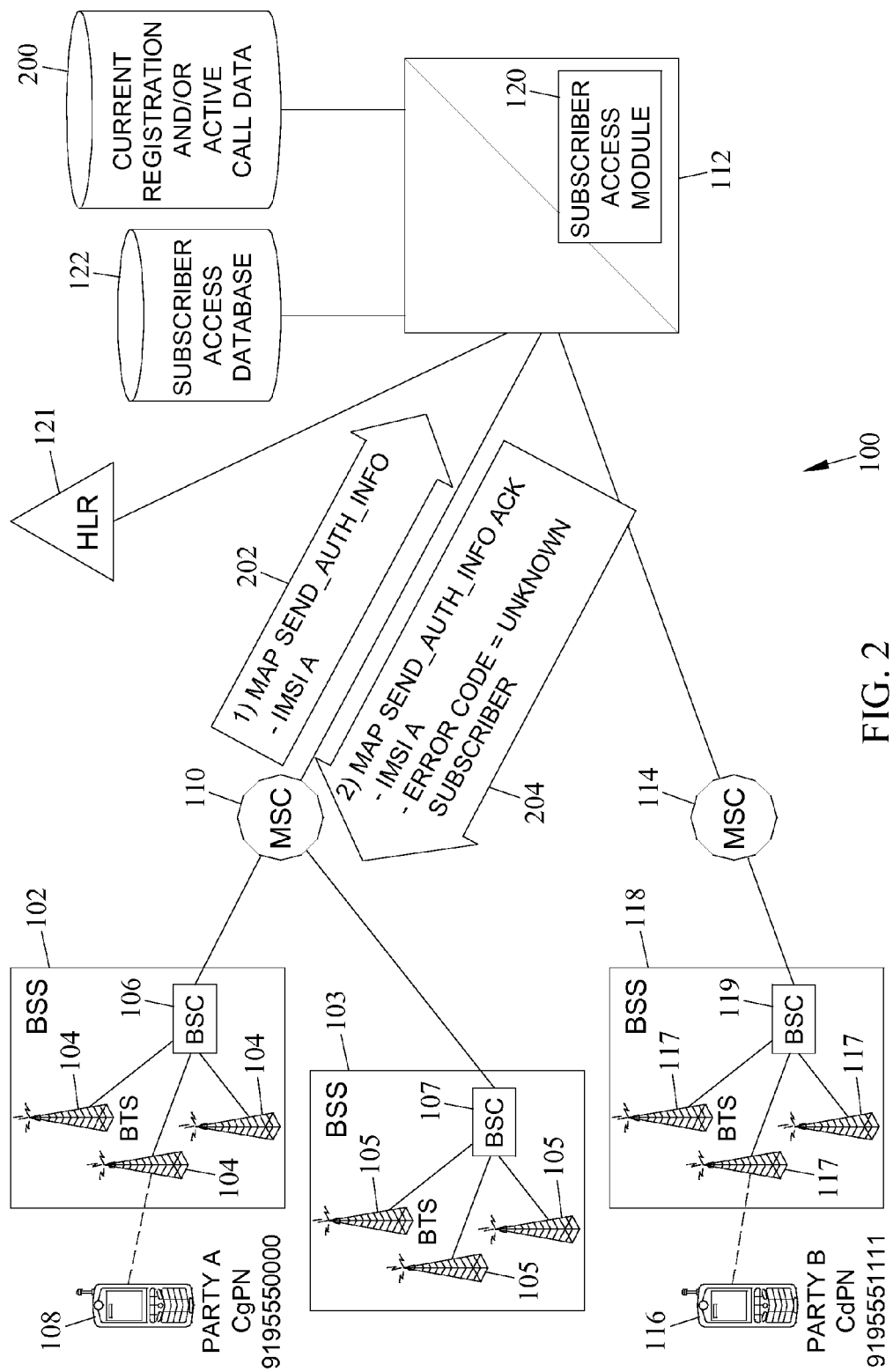
FIG. 2 is a network diagram of a mobile communications network including a subscriber access module for controlling access to voice resources using mobility management messages according to an embodiment of the subject matter described herein.

FIG. 2 is a network diagram of a mobile communications network including a subscriber access module for controlling access to voice resources using mobility management messages according to an embodiment of the subject matter described herein. In the embodiment shown in FIG. 2, network 100 may further include current registration and/or active call database 200 for storing current registration and/or active call data associated with subscribers served by HLR 121. For example, database 200 may contain status and location information associated with one or more mobile subscribers registered in network 100. Similar to subscriber access database 122, database 200 may be integrated, co-located, or separately located and accessible by subscriber access module 120 without departing from the scope of the subject matter described herein. Therefore, the embodiment shown in FIG. 2 illustrating database 200 located separately from integrated access subscriber module 120 is but one possible embodiment for locating current registration and/or active call database 200.

For example, subscriber access module may intercept MAP SEND_AUTHENTICATION_INFO message 202 which is directed to HLR 121 and extract one or more parameters. In this case, MAP SEND_AUTHENTICATION_INFO message 202 includes IMSI A associated with user A 108, therefore subscriber access module 120 may extract and use IMSI A to query subscriber access database 122. As described above, subscriber access database 122 may associate mobility management information with one or more priority levels for a mobile subscriber. Therefore, the result of the query performed by subscriber access module 120 based on IMSI A may include a priority level associated with user A 108. Subscriber access module 120 may use the determined priority level to control access to voice resources for user 108. For example, as shown in FIG. 2, subscriber access module 120 may generate and return MAP SEND_AUTHENTICATION_INFO_ACK message 204 including an error code. Exemplary error codes that may be included in MAP SEND_AUTHENTICATION_INFO message include roaming not allowed, unknown subscriber, system failure, or unexpected data value. Upon receiving MAP SEND_AUTHENTICATION_INFO_ACK message 204 including the error code, MSC 110 may be unable to authenticate user 108 in network 100. Accordingly, voice resources may be preserved for high priority callers during an emergency.

Figure 3:
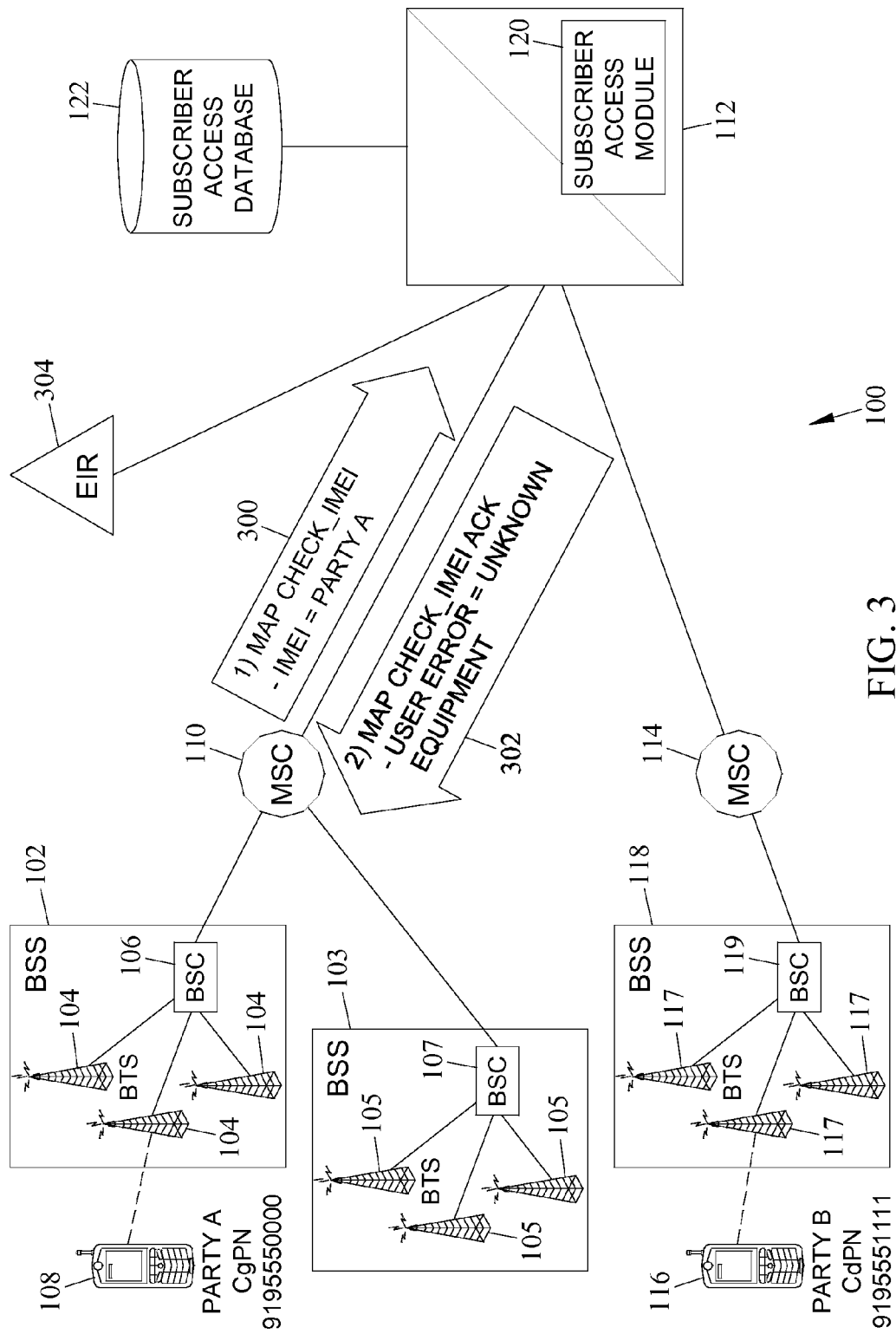
FIG. 3 is a network diagram of a mobile communications network including a subscriber access module for controlling access to voice resources using mobility management messages according to an embodiment of the subject matter described herein.

FIG. 3 is a network diagram of a mobile communications network including a subscriber access module for controlling access to voice resources using mobility management messages according to an embodiment of the subject matter described herein. Referring to FIG. 3, user 108 may prevented from accessing voice resources by intercepting a CHECK_IMEI message and returning a CHECK_IMEI Acknowledgement message indicating that the user equipment is unauthorized based on a lookup in subscriber access database 122.

In network 100, equipment identity register (EIR) 304 may be connected to MSC 110 via STP/SG 112 and may include one or more IMEI numbers. When user 108 connects to MSC 110, a MAP CHECK_IMEI message may be generated by MSC 110 in order to determine whether the subscriber's handset has been stolen. All mobile handsets may be associated with a unique international mobile equipment identity (IMEI) number so that in the event that an unauthorized user steals another user's handset and attempts to place a call using a different SIM card, the theft may be detected and the call may be prohibited. In order to provide this feature, network 100 may include EIR 304 containing one or more IMEI numbers for responding to CHECK_IMEI queries. IMEI numbers stored in EIR 304 may, for example, comprise either a blacklist or a whitelist, where a blacklist indicates IMEI numbers that should be prevented from registering in network 100 and a whitelist indicates IMEI numbers that should be allowed to register in network 100. Thus, a CHECK_IMEI query message may be used to determine whether a particular handset connected to MSC 110 is authorized. If the IMEI numbers included in EIR 304 are associated with a blacklist, a lookup performed by EIR 304 locating a matching entry indicates that the IMEI is not authorized. In response to determining that the IMEI number is not authorized, EIR 304 may generate a CHECK_IMEI_ACK message 302 including a user error, such as "equipment unknown" and send the message to the query originator (i.e., MSC 110).

In contrast to conventional methods, the embodiment shown in FIG. 3 provides for intercepting CHECK_IMEI query message 300 directed to EIR 304 and controlling access to voice resources based on a priority level. For example, subscriber access module 120 may receive CHECK_IMEI query message 300 before reaching intended destination node EIR 304 and extract one or more identifiers from CHECK_IMEI query message 300. The IMEI number associated with mobile handset 108 may be used to query subscriber access database 122. The lookup performed in subscriber access database 122 may return a priority level associated with subscriber 108. Based on this priority level, subscriber access module 120 may control access to voice resources in network 100. For example, if subscriber access module 120 determines that the priority level associated with user 108 is below a predetermined threshold set by a system administrator, subscriber access module 120 may generate and return a CHECK_IMEI_ACK message to MSC 110 including a user/provider error code. In this way, subscriber access module 120 may respond on behalf of EIR 304 in order to block registration of non-emergency and other low-priority users.

Figure 4:
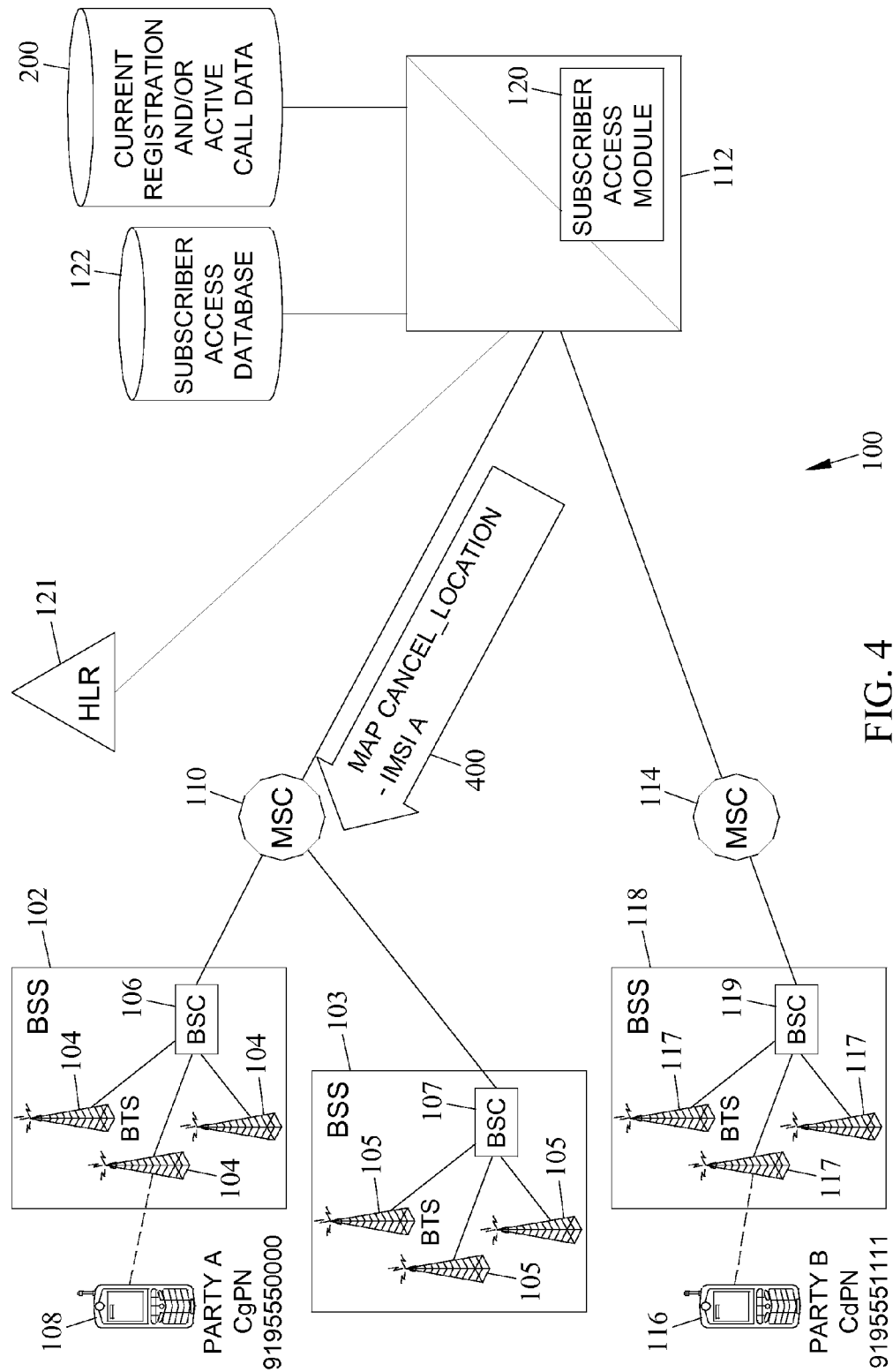
FIG. 4 is a network diagram of a mobile communications network including a subscriber access module for controlling access to voice resources using mobility management messages according to an embodiment of the subject matter described herein.

FIG. 4 is a network diagram of a mobile communications network including a subscriber access module for controlling access to voice resources using mobility management messages according to an embodiment of the subject matter described herein. Referring to FIG. 4, subscriber access module 120 may be configured to maintain and/or access current registration information database 200 for subscribers connected to network 100. In an emergency, or other time period during which an operator may wish to limit access to voice resources, subscriber access module 120 may be configured to generate and send MAP CANCEL_LOCATION messages to MSCs 110 and 114. For example, subscriber access module 120 may send CANCEL_LOCATION message 400 to MSC 110 which includes an international mobile subscriber identity (IMSI) number associated with user 108. CANCEL_LOCATION messages are typically sent by an HLR when a subscriber is roaming. For example, HLR 121 may maintain current location information for mobile subscriber 108. When subscriber 108 roams into a new area, updated location information is sent to HLR 121 and location information associated with the last known location of subscriber 108 is canceled.

In one embodiment, subscriber access module 120 may send CANCEL_LOCATION messages for subscribers associated with a non-emergency or low-priority class of service. For example, subscriber access module may compare one or more identifiers located in subscriber access database 122 to identifiers located in current registration information database 200. CANCEL_LOCATION messages may be generated for users indicated by database 200 as currently registered in network 100 yet having a priority level below a predetermined threshold as indicated by database 122 and sent to one or more MSCs 110 and 114. In response to receiving CANCEL_LOCATION message 400, MSC 110 may terminate an active call associated with user 108.

The effect of broadcasting CANCEL_LOCATION messages associated with one or more subscribers is to de-register the subscribers from network 100 and force them to re-register. Other methods as described herein may then be used in combination with de-registration to prevent re-registration of users based on their priority level.

Figure 5:
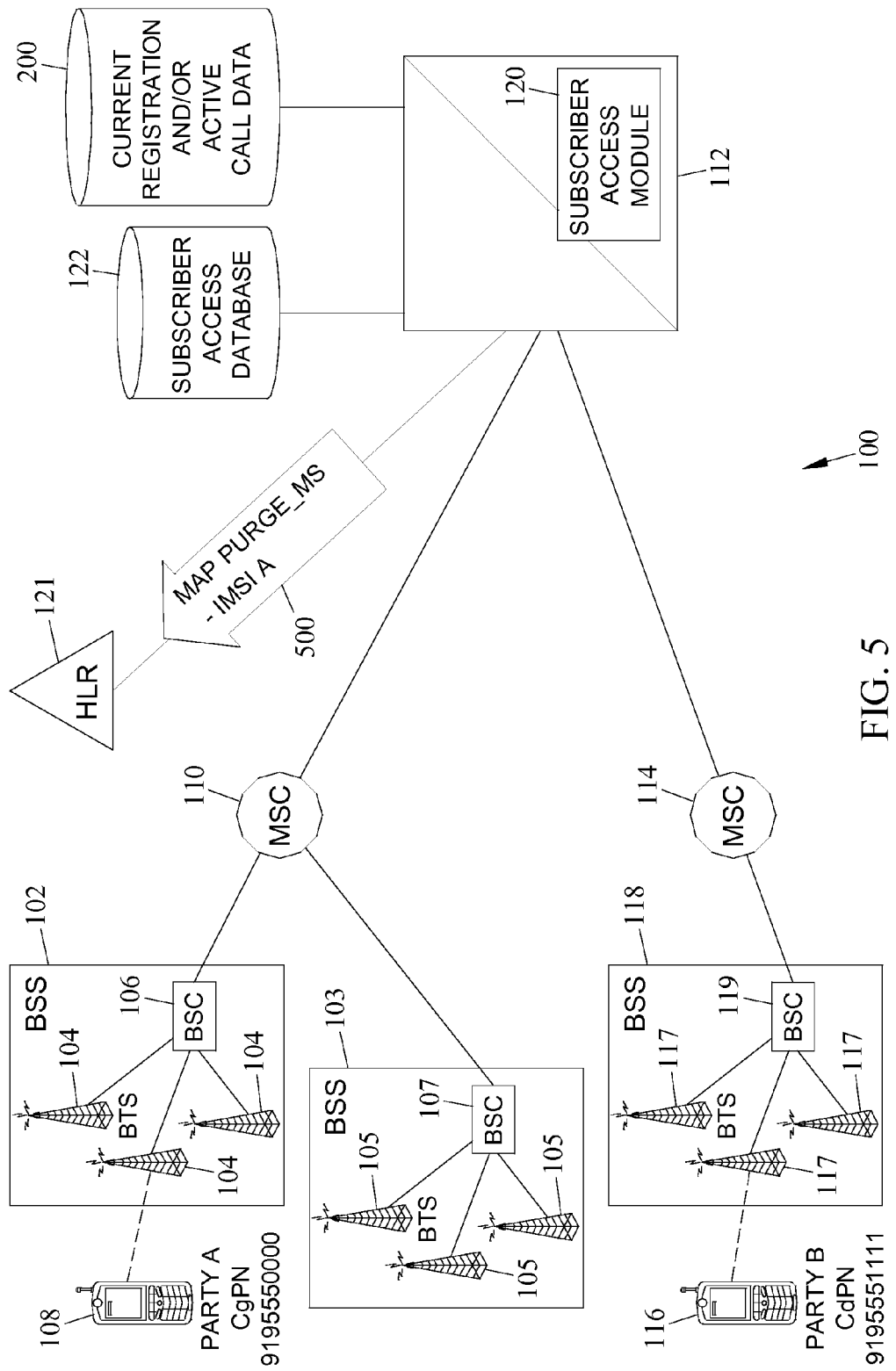
FIG. 5 is a network diagram of a mobile communications network including a subscriber access module for controlling access to voice resources using mobility management messages according to an embodiment of the subject matter described herein.

FIG. 5 is a network diagram of a mobile communications network including a subscriber access module for controlling access to voice resources using mobility management messages according to an embodiment of the subject matter described herein. Referring to FIG. 5, subscriber access module 120 may be configured to maintain and/or access subscriber access database 122 and current registration information database 200. Subscriber access module 120 may further be configured to compare one or more subscriber identifiers located in databases 122 and 200 in order to determine a list of subscribers currently registered in network 100 and having a priority level below a predetermined threshold. Upon compiling the list of subscribers, subscriber access module 120 may generate and send a MAP PURGE_MS 500 message associated with each subscriber to HLR 121. In response to receiving PURGE_MS message 500, HLR 121 may then remove entries associated with subscriber 108.

The effect of generating and sending one or more MAP PURGE_LOCATION messages to HLR 121 associated with non-emergency or other low-priority subscribers includes removing routing information associated with low-priority subscribers from HLR 121. Subsequent routing information requests directed to HLR 121 for these subscribers will return a routing information response message indicating that the subscriber is not reachable in network 100. Call termination may thereby be prevented for non-emergency subscribers in a transparent manner by "tricking" the HLR into thinking that non-emergency subscribers as defined by subscriber access module 120 and subscriber access database 122 are not reachable.

One advantage of sending a MAP PURGE_MS message to HLR 121 is that redundant maintenance of last known MSC ID information for subscribers is avoided. Because a primary module of HLR 121 is to maintain last known MSC ID information, subscriber access module 120 may utilize the information by triggering HLR 121 to generate an appropriate de-registration mobility management message in response to receiving MAP PURGE_MS message 500.

Figure 6:
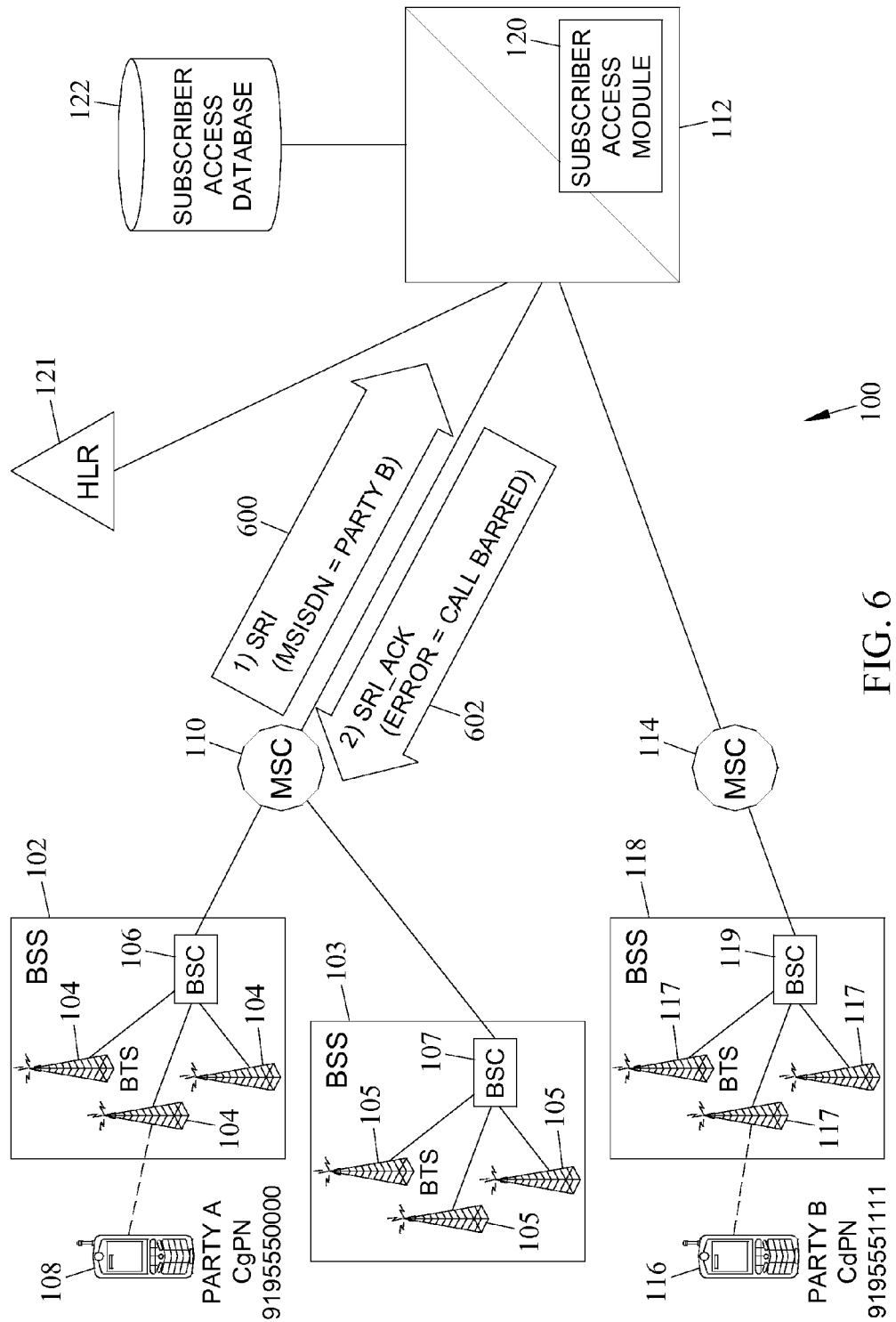
FIG. 6 is a network diagram of a mobile communications network including a subscriber access module for controlling access to voice resources using mobility management messages according to an embodiment of the subject matter described herein.

FIG. 6 is a network diagram of a mobile communications network including a subscriber access module for controlling access to voice resources using mobility management messages according to an embodiment of the subject matter described herein. Referring to FIG. 6, subscriber access module 120 may be configured to receive send routing information (SRI) query message 600 and, based on information extracted from SRI query message 600, may determine whether to control access to voice resources for the subscriber. Access to voice resources may be controlled by generating SRI response message 602 and sending message 602 to the query originator (i.e., MSC 114). In this way, subscriber access module 120 may respond on behalf of HLR 121 for non-emergency subscribers, such as user 108, by generating SRI response message 602 which includes an error code indicating that call termination is not available. As described above with respect to FIG. 1, exemplary error codes may include roaming not allowed, unknown subscriber, system failure, or unexpected data value. However, other error codes, or no error code, may be included in SRI response message 602 without departing from the scope of the subject matter described herein.

Previously, SRI messages were used for providing routing information for mobile subscribers, whose location was independent of their identity. Consequently, SRI messages were not needed for landline-terminated calls, whose location was readily identifiable based on the called party identifier. However, telecommunications providers were required to provide number portability (NP) services for landline subscribers, so that their location may be independent of their subscriber identity. As a result, SRI queries and other NP lockups may be performed for both mobile-terminated and landline-terminate calls.

Figure 7:
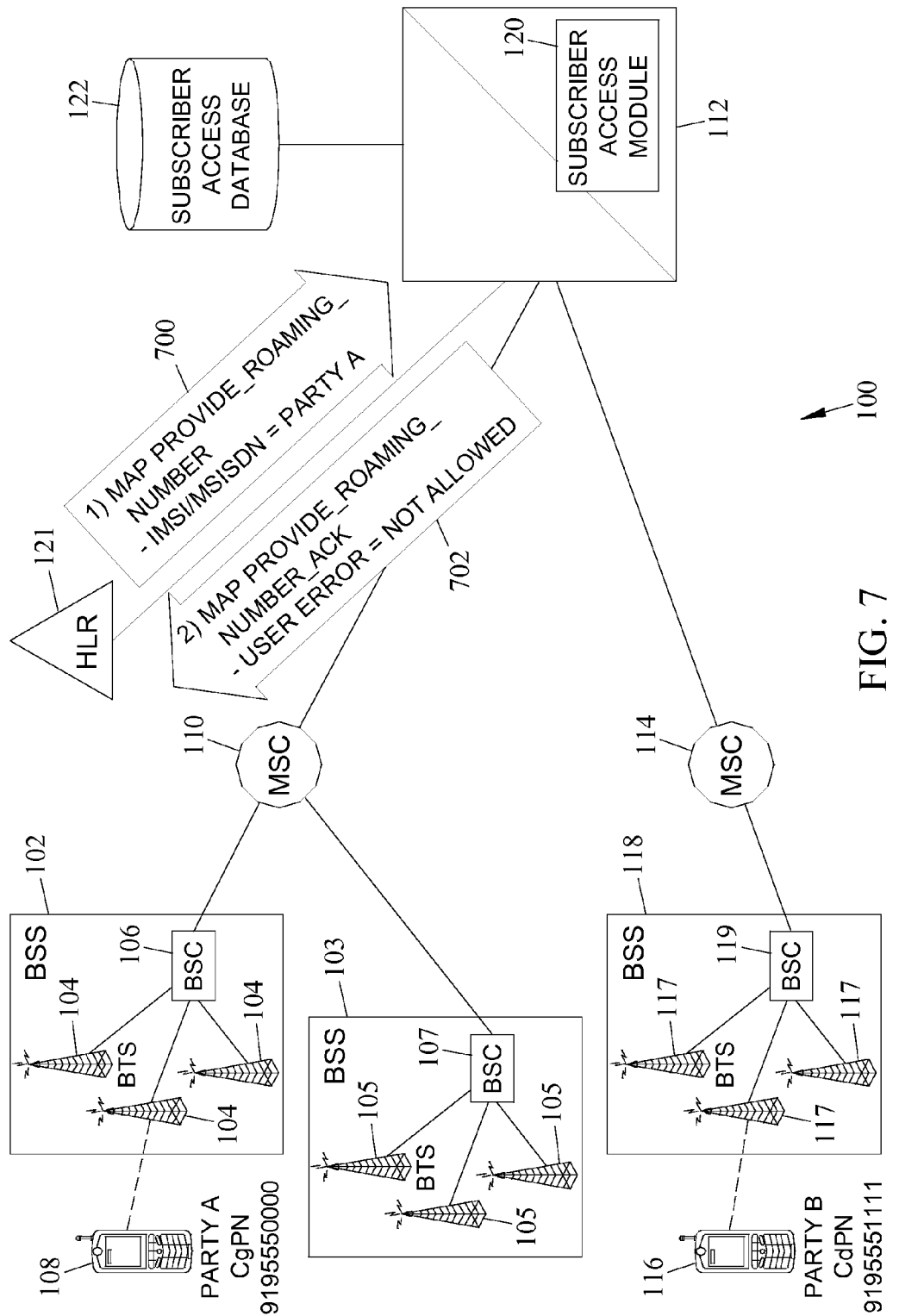
FIG. 7 is a network diagram of a mobile communications network including a subscriber access module for controlling access to voice resources using mobility management messages according to an embodiment of the subject matter described herein.

FIG. 7 is a network diagram of a mobile communications network including a subscriber access module for controlling access to voice resources using mobility management messages according to an embodiment of the subject matter described herein. In FIG. 7, subscriber access module 120 may intercept a MAP PRN message requesting a roaming number needed in order to set up a call. A roaming number may be used temporarily for connecting a call across a network boundary between different and/or incompatible numbering schemes. Roaming numbers may be requested by an HLR and issued by an MSC associated with the call. For example, PROVIDE_ROAMING_NUMBER (PRN) message 700 may be sent from HLR 121 to MSC 110 serving mobile user 108 for processing an incoming call. In response to receiving PRN message 700, MSC 110 may forward PROVIDE_ROAMING_NUMBER_ACK message 702 including a mobile station roaming number (MSRN) to MSC 110. The MSRN may be used by MSC 110 to route the call to the correct MSC.

Figure 8:
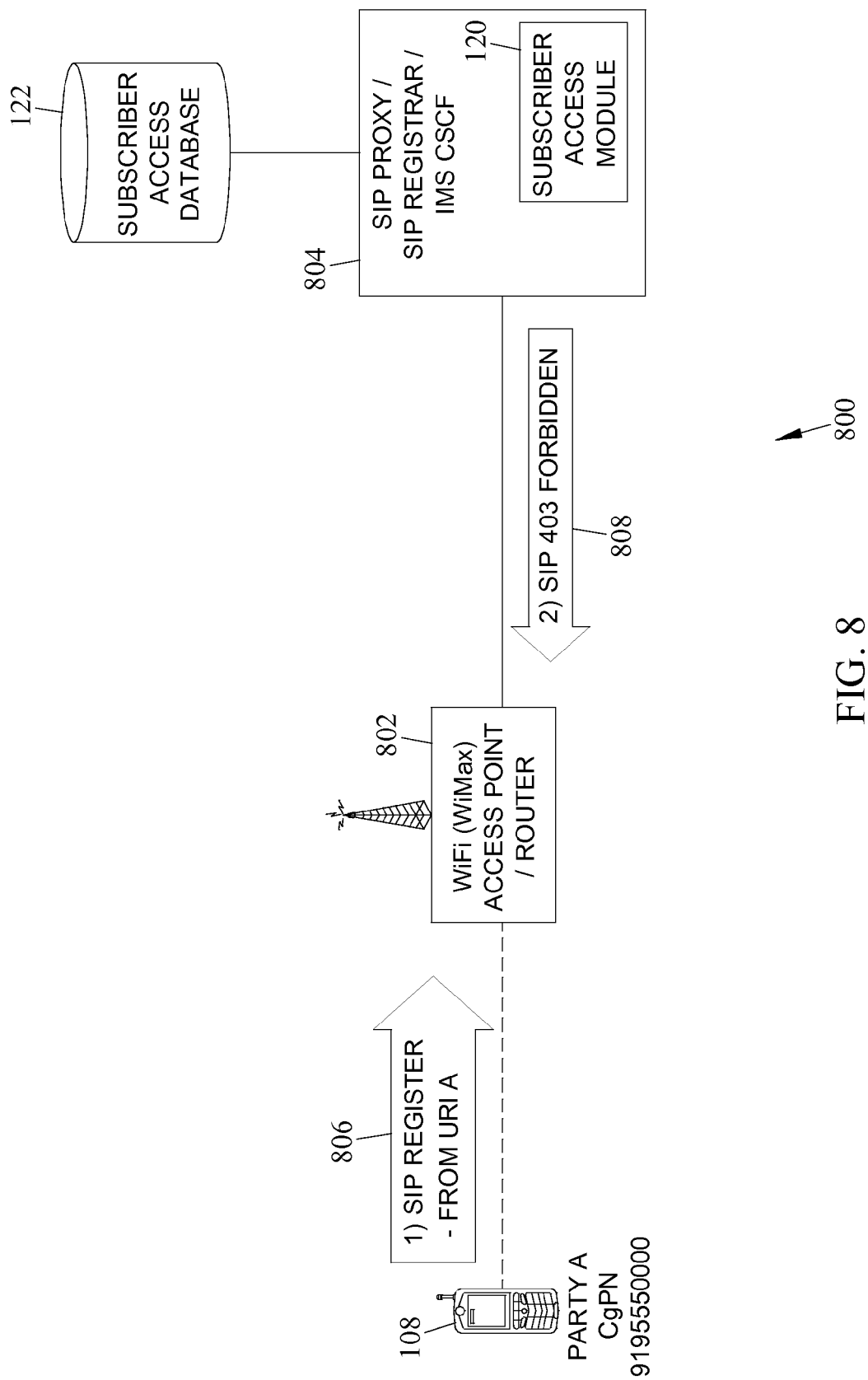
FIG. 8 is a network diagram of a mobile communications network including a subscriber access module for controlling access to voice resources using mobility management messages according to an embodiment of the subject matter described herein.

FIG. 8 is a network diagram of a mobile communications network including a subscriber access module for controlling access to voice resources using mobility management messages according to an embodiment of the subject matter described herein. Referring to FIG. 8, network 800 may include a session initiation protocol (SIP) network for providing SIP-based services. SIP network 800 may include SIP-capable handset 108 for communicating with WiFi/WiMAX access point/router 802 and SIP node 804. SIP node 804 may include a SIP proxy server, a SIP registrar, an Internet multimedia subsystem (IMS) call session control module (CSCF), or any combination thereof. Additionally, in the embodiment shown in FIG. 8, SIP node 804 may include subscriber access module 120 for controlling access to voice resources based on a SIP mobility management message. Similar to embodiments described above with respect to FIGS. 1-8, SIP node 804 may be connected to subscriber access database 122 for associating one or more subscriber identifiers with a priority level, wherein the subscriber identifier and the priority level are associated with a mobile subscriber.

In one embodiment, subscriber access module 120 may intercept a SIP REGISTER 806 message or another SIP mobility management message associated with subscriber 108. Subscriber access module 120 may be configured to respond on behalf of the intended SIP destination by sending a negative acknowledgment message for subscribers having a low priority level. By generating a negative acknowledgment message, access to voice resources may be controlled by blocking and/or denying registration requests for low-priority SIP users.

For example, SIP user 108 may attempt to register in SIP network 800 by sending SIP REGISTER message 806 including a uniform resource indicator (URI) A associated with user 108. Register message 806 may be received by WiFi/WiMAX access point/router 802 and routed to SIP registrar node 804. However, subscriber access module 120 may intercept REGISTER message 806 and extract the URI associated with user 108, such as a URI. The subscriber identifier may be used to search subscriber access database 122 for determining a priority level associated with subscriber 108. By comparing the determined priority level to a priority level threshold set by a system administrator, subscriber access module 120 may limit access to voice resources for subscriber 108. Limiting access to voice resources may include, for example, generating a negative acknowledgment message such as SIP 403 Forbidden message 808, and sending the message to the query originator. It is appreciated, however, that other negative acknowledgment messages may be used without departing from the scope of the subject matter described herein.

Figure 9:
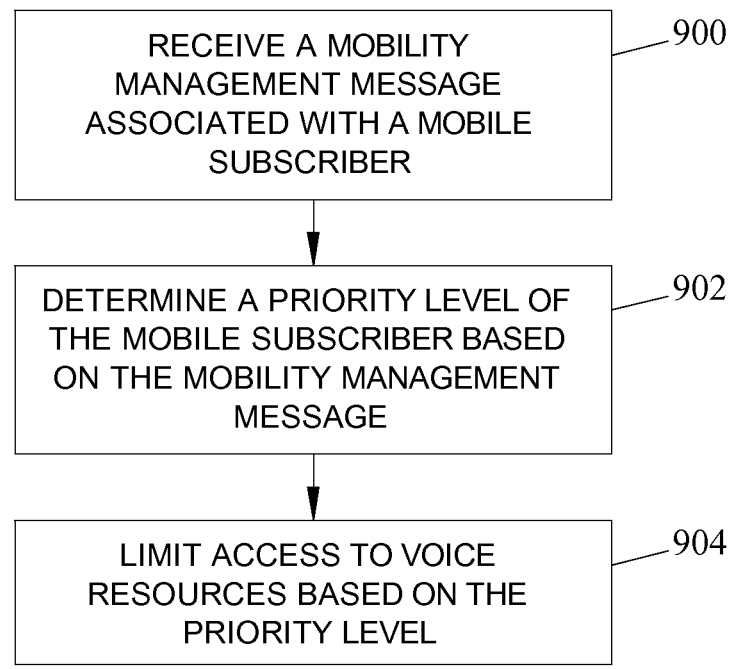
FIG. 9 is flow chart illustrating exemplary steps for controlling access to voice resources using mobility management messages according to an embodiment of the subject matter described herein.

FIG. 9 is flow chart illustrating exemplary steps for controlling access to voice resources using mobility management messages according to an embodiment of the subject matter described herein. Referring to FIG. 9, in block 900, a mobility management message associated with a mobile subscriber is received. For example, subscriber access module 120 may receive one of a MAP update location message, a MAP send authentication information message, MAP check IMEI message, an SRI message, MAP provide roaming number message, and a SIP register message.

In block 902, a priority level of the mobile subscriber is determined based on the mobility management message. For example, a lookup may be performed in subscriber access database 122 using mobility management information extracted from a mobility management message received by subscriber access module 120. For example, basic plan customers may be assigned priority level 3 and premium plan subscribers may be assigned priority level 6. For example, priority level 3 users may include blackberry devices for individual users and priority level 6 users may include cellular phones for the doctors in a hospital. During low-traffic times, the priority level may be set at 2 by the administrator of subscriber access module 120 indicating that all users may register in network 100 and place calls. During high-traffic times, the administrator may set the priority level at level 5, thereby preventing priority level 2 users from registering, while allowing access to voice resources for priority level 6 users.

In block 904, access to voice resources is limited based on the priority level. For example, if a priority level associated with a subscriber is below a predetermined threshold, subscriber access module 120 may prevent registration of the user in the network, de-register the user, or prevent termination of calls for a registered user. Subscriber access module 120 may implement these modules by, for example, discarding a mobility management message, purging data from an HLR, generating a CANCEL_LOCATION message, or generating a negative acknowledgment message containing an error code.

Additionally, access to voice resources may be limited differently depending on whether the subscriber is a calling party or a called party. For example, a first entry in subscriber access database 122 may associate a high priority level for user 108 if he or she is a called party and may associated a low priority level for user 108 when he or she is a calling party based on CgPN/CdPN information extracted from a mobility management message. This allows a system administrator to prioritize voice resources such that user 108 may, for example, receive calls during an emergency, but may not place calls.

In another embodiment, access to voice resources may be limited differently depending on the identity of the MSC serving the subscriber. For example, calling party 108 may attempt to register in network 100 by connecting to a BTS 104 located in BSS 102 and sending a mobility management message to MSC 110. Based on a lookup performed by subscriber access module 120 of subscriber access database 122, it may be determined that the priority level associated with subscriber 108 and MSC 110 is below the current threshold set by the administrator. However, subscriber 108 may move to an area served by BSS 118 and attempt to re-register in network 100. Similarly, a mobility management message may be sent from MSC 114 and intercepted by subscriber access module 120. A lookup may be performed in subscriber access database 122 based on the combination of user 108 and MSC 114. Because this combination may be associated with a different priority level, user 108 may be allowed to register in network 100 and access voice resources (i.e., make or receive a call). For example, user 108, when connected to MSC 114, may be assigned a priority level above the current threshold set by the administrator.

One advantage of controlling access to voice resources using a variety of mobility management information included in different typed of mobility management messages is that access to voice resources may be customized with greater granularity than otherwise possible if the determination were based solely on an identifier associated with user 108. Thus, in the event that the availability of voice resources is strained, even to high priority users, a system administrator may further control access to voice resources in order to ensure that the most immediate communications needs are met. For example, during a fire emergency, BSS 102 may serve firefighters at the scene of the fire and BSS 118 may serve government officials at city hall. While both of these groups of users may be categorized identically, there may be only enough voice resources in network 100 to serve one group. By using an MSCID in addition to a subscriber identifier, a system administrator may reserve voice resources first for the firefighters served by MSC 110 and second for the government officials served by MSC 114.

Figure 10:
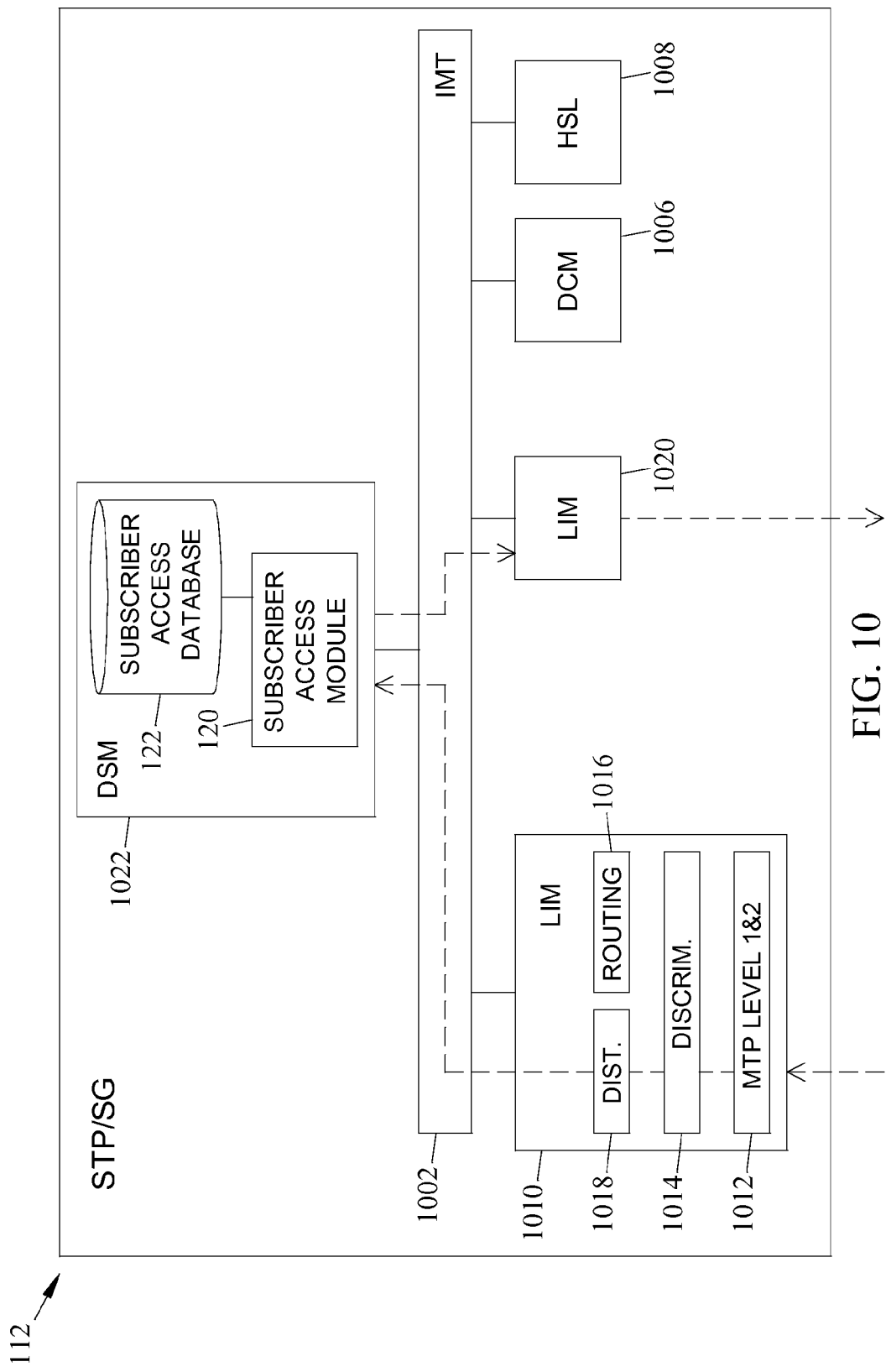
FIG. 10 is a block diagram architecture diagram of an exemplary signaling node including an integrated subscriber access module for controlling access to voice resources using mobility management messages according to an embodiment of the subject matter described herein.

FIG. 10 is a block diagram of an exemplary internal architecture of a signaling message routing node, such as STP/SG 112, with an integrated subscriber access module 120 and an integrated subscriber access database 122 according to an embodiment of the subject matter described herein. Referring to FIG. 10, STP/SG 112 may include an internal communications bus 1002 that includes two counter-rotating serial rings. In one embodiment, a plurality of processing modules or cards may be coupled to bus 1002. In FIG. 10, bus 1002 may be coupled to one or more communications modules, such as a link interface module (LIM) 1010, a data communications module (DCM) 1006, a database service module (DSM) 1022, and a high speed link (HSL) 1008. Each of these modules is physically connected to bus 1002 such that signaling and other types of messages may be routed internally between active cards or modules. LIM 1010 includes functionality for sending and receiving SS7 messages via an SS7 network. DCM 1006 includes functionality for sending and receiving SS7 messages over IP signaling links. Similarly, HSL 1008 includes functionality for sending and receiving messages over a high speed link.

When a mobility management signaling message, such as an SRI query, is received by STP/SG 114, the message may be processed by LIM 1010, DCM 1006, or HSL 1008 depending on whether the message is sent over an SS7 link, an IP signaling link, or a high speed link. The message is passed up the communications protocol stack (e.g., MTP level 1&2 processing module 1012, discrimination module 1014, etc.) on the receiving communication module until it reaches the module's respective message distribution module 1018, which forwards the message to DSM 1022. In one embodiment, at least one DSM module 1022 in STP/SG 112 is equipped with a subscriber access module 120 and subscriber access database 122. That is, in one implementation, messages received by LIM 1010 or 1020, DCM 1006, or HSL 1008 may be processed at mobility module 116 and identified as candidates for subscriber access processing. For example, subscriber access module 120 may query subscriber access database 122 in the manner described above to determine whether the subscriber should be prevented from accessing voice resources.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for controlling access to voice resources using mobility management messages in a mobile communications network, the method comprising:

receiving, from a mobile switching center (MSC), a mobility management message associated with a mobile subscriber, wherein the mobility management message includes a subscriber identifier and the MSC identifier;

determining a priority level of the mobile subscriber based on the subscriber identifier and the MSC identifier included in the mobility management message;

controlling access to voice resources for the mobile subscriber based on the priority level, wherein controlling access to voice resources includes one of: blocking registration of a mobile device, terminating an existing call for a mobile device, discarding the mobility management message, and generating a mobility management response message;

wherein controlling access to voice resources includes generating one of a mobile application part (MAP) update location acknowledgement message, a MAP send authentication information acknowledgment message, a MAP check (IMEI) acknowledgment message, a MAP cancel location message, a MAP purge mobile subscriber message, a send routing information (SRI) response message, a MAP provide roaming number acknowledgement message, and a SIP acknowledgment message; and including an error code in the generated message, wherein including the error code includes including one of an unknown subscriber error code, a roaming not allowed error code, a system failure error code, and an unexpected data value error code.

2. The method of claim 1 wherein receiving a mobility management message includes receiving one of a global system for mobile communications (GSM) mobility management message, a universal mobile telecommunications system (UMTS) mobility management message, and a session initiation protocol (SIP) mobility management message.

3. The method of claim 1 wherein receiving a mobility management message includes receiving one of a mobile application part (MAP) update location message, a MAP send authentication information message, a MAP check international mobile equipment identity (IMEI) message, a send routing information (SRI) message, a MAP provide roaming number message, and a session initiation protocol (SIP) register message.

4. The method of claim 1 wherein determining a priority level of the mobile subscriber includes determining the priority level based on one of an international mobile subscriber identity (IMSI), an international mobile equipment identity (IMEI), a mobile subscriber integrated services digital network number (MSISDN), a session initiation protocol (SIP) uniform resource indicator (URI), a mobile switching center (MSC) identifier, a calling party identifier (CgPN), and a called party identifier (CdPN).

5. The method of claim 1 wherein controlling access to voice resources includes preventing allocation of voice resources for a registered mobile subscriber.

6. The method of claim 1 wherein controlling user access to voice resources includes, during an emergency, preventing non-emergency personnel from accessing voice trunks.

7. A communications signaling node for controlling access to voice resources using mobility management messages in a mobile communications network, the communications signaling node comprising:
   at least one processor for executing computer executable instructions embodied in a non-transitory computer readable medium;
   a subscriber access database for associating a subscriber identifier and a mobile switching center (MSC) identifier included in a mobility management message with a priority level;
   a subscriber access module executable by the at least one processor for receiving, from the MSC, the mobility management message including the subscriber identifier and the MSC identifier, determining the priority level of the mobile subscriber based on the subscriber identifier and the MSC identifier included in the mobility management message, and controlling access to voice resources for the mobile subscriber based on the priority level, wherein controlling access to voice resources includes one of: blocking registration of a mobile device, terminating an existing call for a mobile device, discarding the mobility management message, and generating a mobility management response message;
   wherein the subscriber access module is configured to generate one of a mobile application part (MAP) update location acknowledgement message, a MAP send authentication information acknowledgment message, a MAP check (IMEI) acknowledgment message, a MAP cancel location message, a MAP purge mobile subscriber message, a send routing information (SRI) response message, a MAP provide roaming number acknowledgement message, and a SIP acknowledgment message; and
   wherein the subscriber access module is configured to generate a message including an error code, wherein the error code includes one of an unknown subscriber error code, a roaming not allowed error code, a system failure error code, and an unexpected data value error code.

8. The communications signaling node of claim 7 wherein the subscriber access module is configured to receive one of a global system for mobile communications (GSM) mobility management message, a universal mobile telecommunications system (UMTS) mobility management message, and a session initiation protocol (SIP) mobility management message.

9. The communications signaling node of claim 7 wherein the subscriber access module is configured to receive one of a mobile application part (MAP) update location message, a MAP send authentication information message, a MAP check international mobile equipment identity (IMEI) message, a send routing information (SRI) message, a MAP provide roaming number message, and a session initiation protocol (SIP) register message.

10. The communications signaling node of claim 7 wherein the subscriber access module is configured to determine the priority level of the mobile subscriber based on one of an international mobile subscriber identity (IMSI), an international mobile equipment identity (IMEI), a mobile subscriber integrated services digital network number (MSISDN), a session initiation protocol (SIP) uniform resource indicator (URI), a mobile switching center (MSC) identifier, a calling party identifier (CgPN), and a called party identifier (CdPN).

11. The communications signaling node of claim 7 wherein controlling access to voice resources includes preventing allocation of voice resources for a registered mobile subscriber.

12. The communications signaling node of claim 7 wherein the subscriber access module is configured to control access to voice resources during an emergency by preventing non-emergency personnel from accessing voice trunks.

13. A non-transitory computer readable medium having stored thereon computer instructions that when executed by a processor of a computer perform steps comprising:
   receiving, from a mobile switching center (MSC), a mobility management message associated with a mobile subscriber, wherein the mobility management message includes a subscriber identifier and the MSC identifier;
   determining a priority level of the mobile subscriber based on the subscriber identifier and the MSC identifier included in the mobility management message;
   controlling access to voice resources for the mobile subscriber based on the priority level, wherein controlling access to voice resources includes one of: blocking registration of a mobile device, terminating an existing call for a mobile device, discarding the mobility management message, and generating a mobility management response message;
   wherein controlling access to voice resources includes generating one of a mobile application part (MAP) update location acknowledgement message, a MAP send authentication information acknowledgment message, a MAP check (IMEI) acknowledgment message, a MAP cancel location message, a MAP purge mobile subscriber message, a send routing information (SRI) response message, a MAP provide roaming number acknowledgement message, and a SIP acknowledgment message; and
   including an error code in the generated message, wherein including the error code includes including one of an unknown subscriber error code, a roaming not allowed error code, a system failure error code, and an unexpected data value error code.

* * * * *